(12) United States Patent
Gill (10) Patent No.: US 6,567,244 B1
(45) Date of Patent: May 20, 2003

(54) DIFFERENTIAL YOKE TYPE READ HEAD

(75) Inventor: Hardayal Singh Gill, Portala Valley, CA (US)

(73) Assignee: Hitachi Global Storage Technologies Netherlands, Amsterdam (NL)

( * ) Notice: Subject to any disclaimer, the term of this patent is extended or adjusted under 35 U.S.C. 154(b) by 379 days.

(21) Appl. No.: 09/686,191

(22) Filed: Oct. 10, 2000

(51) Int. Cl.[7] .................................................. G11B 5/39
(52) U.S. Cl. ..................... 360/314; 360/317; 360/324.1; 360/324.2
(58) Field of Search ................................ 360/314, 317, 360/324.1, 324.11, 324.12, 324.2

(56) References Cited

U.S. PATENT DOCUMENTS

| | | | |
|---|---|---|---|
| 5,757,056 A | 5/1998 | Chui .......................... | 257/421 |
| 5,862,022 A | 1/1999 | Noguchi et al. .......... | 360/324.2 |
| 5,898,548 A | 4/1999 | Dill et al. ................. | 360/324.2 |
| 5,901,018 A | 5/1999 | Fontana, Jr. et al. ..... | 360/324.2 |
| 6,256,863 B1 * | 7/2001 | Saito et al. ............... | 29/603.08 |
| 6,278,589 B1 * | 8/2001 | Gill ............................ | 360/314 |
| 6,344,954 B1 * | 2/2002 | Redon et al. ............. | 360/324.2 |
| 6,473,275 B1 * | 10/2002 | Gill ............................ | 360/314 |
| 6,486,662 B1 * | 11/2002 | Ruigrok et al. ............ | 324/252 |

* cited by examiner

*Primary Examiner*—Jefferson Evans
(74) *Attorney, Agent, or Firm*—Ervin F. Johnston (57) ABSTRACT

A read head, which has an air bearing surface (ABS), includes a yoke which has first and second legs which are interconnected at a location within the head at a distance $d_1$ from the ABS wherein the first and second legs have first and second end edges respectively which are located at the ABS and spaced apart by a distance $d_2$. The first and second legs have first and second separations respectively which are located between the ABS and the distance $d_1$ and which magnetically and electrically disconnect leg portions of each leg. The first sensor is magnetically and electrically connected to the first leg across a first separation and a second sensor is magnetically and electrically connected to the second leg across the second separation. The first sensor has a first pinned layer structure and the second sensor has a second pinned layer structure wherein the first and second pinned layer structures have first and second magnetic moments respectively that are antiparallel with respect to each other. With this arrangement the magnetic moments of the read head are out-of-phase with respect to each other so that changes in resistances of the sensors due to field signals, which have a spacing $d_3$ equal to the spacing $d_2$, cause resistances of the sensors to combine to increase the signal of the head and reduce noise by common mode rejection and the remote location of the sensors from the ABS reduces the risk of shorting of the layers of the head when the head is lapped to the ABS.

41 Claims, 8 Drawing Sheets

DIFFERENTIAL YOKE TYPE READ HEAD

BACKGROUND OF THE INVENTION

1. Field of the Invention

The present invention relates to a differential yoke type read head and, more particularly, to first and second sensors which are located on first and second legs of a yoke at locations remote from an air bearing surface wherein the sensors have pinned layers which have magnetic moments which are 180° out-of-phase with respect to each other.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk wherein the ABS is an exposed surface of the sensor that faces the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a tunnel junction sensor for sensing the magnetic signal fields from the rotating magnetic disk. The sensor includes an insulative tunneling or barrier layer sandwiched between a ferromagnetic pinned layer and a ferromagnetic free layer. An antiferromagnetic pinning layer interfaces the pinned layer for pinning the magnetic moment of the pinned layer 90° to the air bearing surface (ABS). The tunnel junction sensor is located between ferromagnetic first and second shield layers. First and second leads, which may be the first and second shield layers, are connected to the tunnel junction sensor for conducting a sense current therethrough. The sense current is conducted perpendicular to the major thin film planes (CPP) of the sensor as contrasted to a spin valve sensor where the sense current is conducted parallel to the major thin film planes (CIP) of the spin valve sensor. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk.

When the magnetic moments of the pinned and free layers are parallel with respect to one another the resistance of the tunnel junction sensor to the sense current ($I_S$) is at a minimum and when their magnetic moments are antiparallel the resistance of the tunnel junction sensor to the sense current ($I_S$) is at a maximum. Changes in resistance of the tunnel junction sensor is a function of cos θ, where θ is the angle between the magnetic moments of the pinned and free layers. When the sense current ($I_S$) is conducted through the tunnel junction sensor resistance changes, due to signal fields from the rotating magnetic disk, cause potential changes that are detected and processed as playback signals.

The sensitivity of the tunnel junction sensor is quantified as magnetoresistive coefficient dr/R where dr is the change in resistance of the tunnel junction sensor from minimum resistance (magnetic moments of free and pinned layers parallel) to maximum resistance (magnetic moments of the free and pinned layers antiparallel) and R is the resistance of the tunnel junction sensor at minimum resistance. The dr/R of a tunnel junction sensor can be on the order of 40% as compared to 10% for a spin valve sensor.

Magnetic head assemblies, wherein each magnetic head assembly includes a read head and a write head combination, are constructed in rows and columns on a wafer. After completion at the wafer level, the wafer is diced into rows of magnetic head assemblies and each row is lapped by a grinding process to lap the row to a predetermined air bearing surface (ABS). In a typical tunnel junction read head all of the layers are exposed at the ABS, namely first edges of each of the first shield layer, the seed layer, the free layer, the barrier layer, the pinned layer, the pinning layer and the second shield layer. The second edges of these layers are recessed in the head. The barrier layer is a very thin layer, on the order of 20 Å, which places the free and pinned layers very close to one another at the ABS. When a row of tunnel junction head assemblies is lapped there is a high risk of magnetic material from the free and pinned layers being smeared across the ABS to cause a short therebetween. When a row of spin valve head assemblies is lapped there is a high risk of magnetic material being smeared between the shield layers and either or both of the free and pinned layers. The risk of shorting, however, is higher with the tunnel junction read head since the sense current is conducted perpendicular to the layers instead of parallel to the layers. Accordingly, there is a strong-felt need to construct magnetic head assemblies, whether they be tunnel junction type or spin valve type, without the risk of shorting between the layers at the ABS due to lapping.

SUMMARY OF THE INVENTION

The present invention minimizes shorting between the layers of either a tunnel junction type sensor or a spin valve type sensor after a magnetic head has been lapped to the ABS. This is accomplished by providing a yoke which has first and second legs which are interconnected at a location within the head at a distance $d_1$ from the ABS wherein the first and second legs have first and second edges respectively which are located at the ABS and spaced apart by a distance $d_2$ and wherein the first and second legs have first and second separations respectively which are located between the ABS and the distance $d_1$ with the first and second separations magnetically disconnecting leg portions of each leg of the yoke. A first sensor is magnetically connected to the first leg across the first separation and a second sensor is connected to the second leg across the second separation. The first sensor has a first pinned layer structure and the second sensor has a second pinned layer structure wherein the first and second pinned layer structures have first and second magnetic moments respectively that are antiparallel with respect to each other. The distance $d_2$ between the end edges of the first and second legs at the ABS are equal to a distance between magnetic impressions along a track of a magnetic disk. Accordingly, as the magnetic disk is rotated with the end edges positioned over a track one end edge will receive a field signal into or out of the head and the other end edge will receive a field signal which is in an opposite direction. Each of the field signals changes a resistance of a respective sensor, which resistances are combined in a sense current circuit and processed by processing circuitry as a playback signal. Not only is the signal significantly increased as compared to a single sensor type read head, but noise in the circuit is cancelled by common mode rejection. One sensor is preferably an antiparallel (AP) pinned type spin valve sensor and the other sensor is preferably a single layer pinned type sensor. With this arrangement the pinned layer structures next to a separation layer between the pinned layer structures have magnetic moments which are antiparallel (out-of-phase with respect to each other) so that the changes in resistances of the spin valve sensors are combined in the sensor current circuit. The present invention can be employed for either horizontally recorded magnetic media or perpendicular recorded magnetic media. In a preferred embodiment each sensor is a tunnel junction type of sensor, however, each sensor may be a spin valve type sensor. In either embodiment there is less risk of smearing between the ferromagnetic layers of the sensor or between these layers and the first and second shield layers so as to minimize the risk of shorting between the layers of the read head after the read head is lapped to the ABS.

An object of the present invention is to provide a read head which has less risk of shorting between the layers after lapping the read head to the ABS.

Another object is to provide the foregoing read head with a significantly increased signal and common mode noise rejection.

A further object is to provide a magnetic disk drive with one or more of the aforementioned read heads wherein a magnetic disk in the drive has a distance between magnetic impressions along a track of the disk which is equal to a distance between end edges of the read head at the ABS for receiving field signals from the magnetic impressions.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
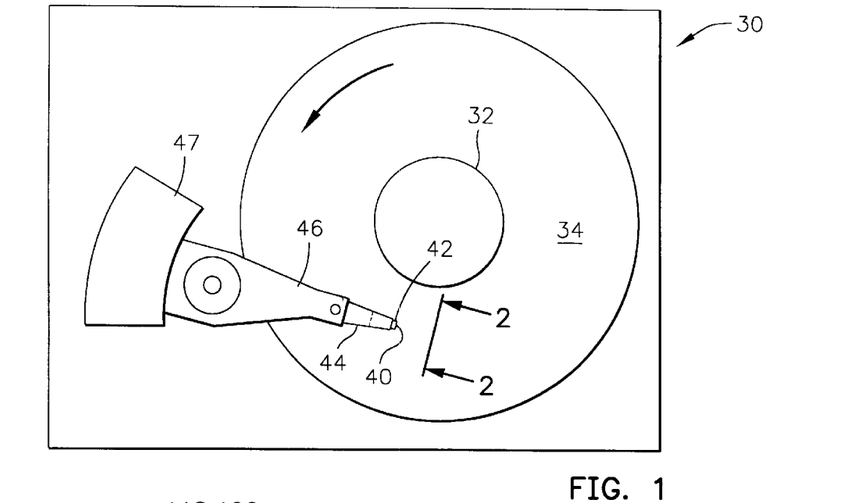
FIG. 1 is a plan view of an exemplary magnetic disk drive.
Figures 2, 3:
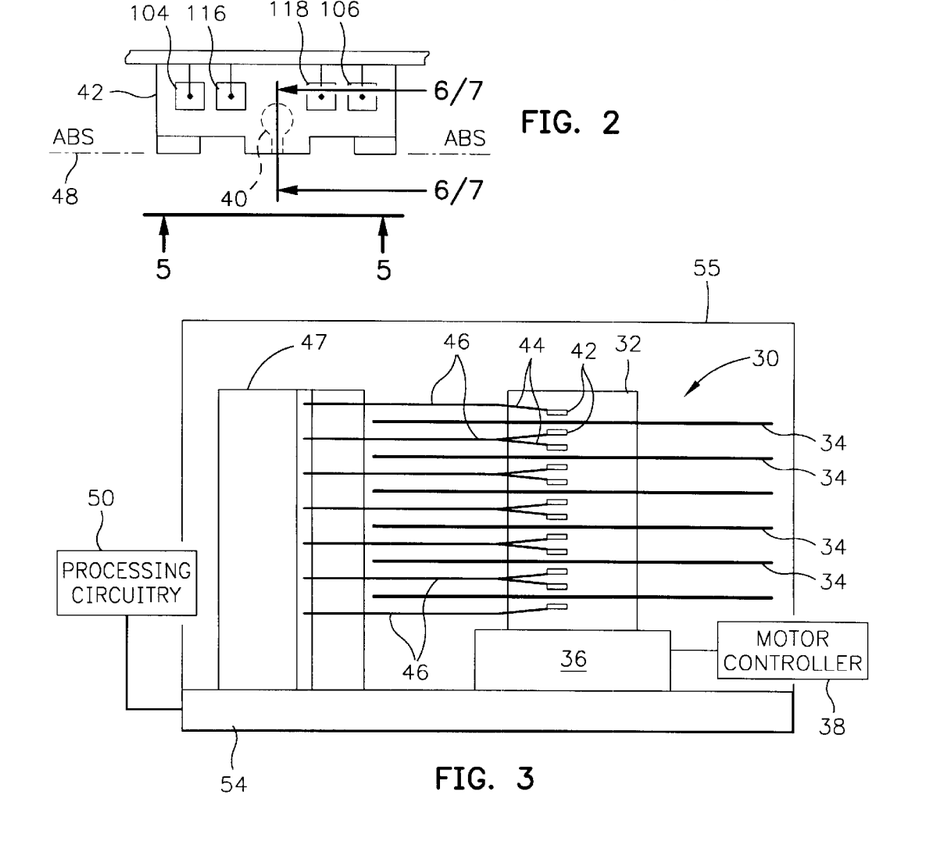
FIG. 2 is an end view of a slider with a magnetic head of the disk drive as seen in plane 2—2 of FIG. 1.
FIG. 3 is an elevation view of the magnetic disk drive wherein multiple disks and magnetic heads are employed.
Figure 4:
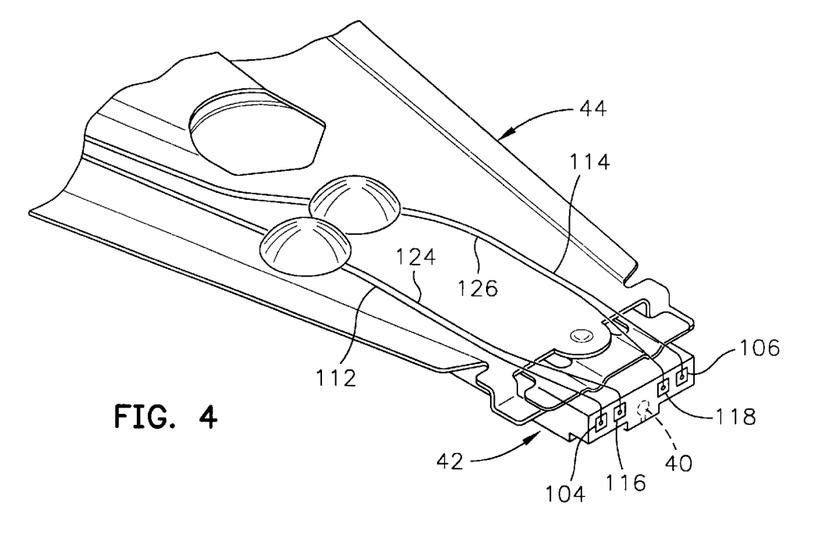
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
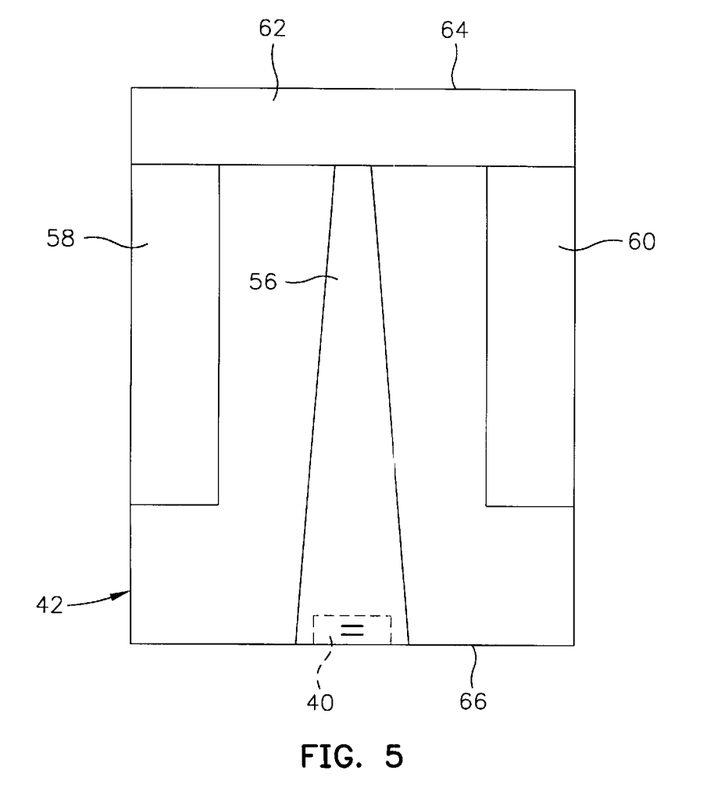
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
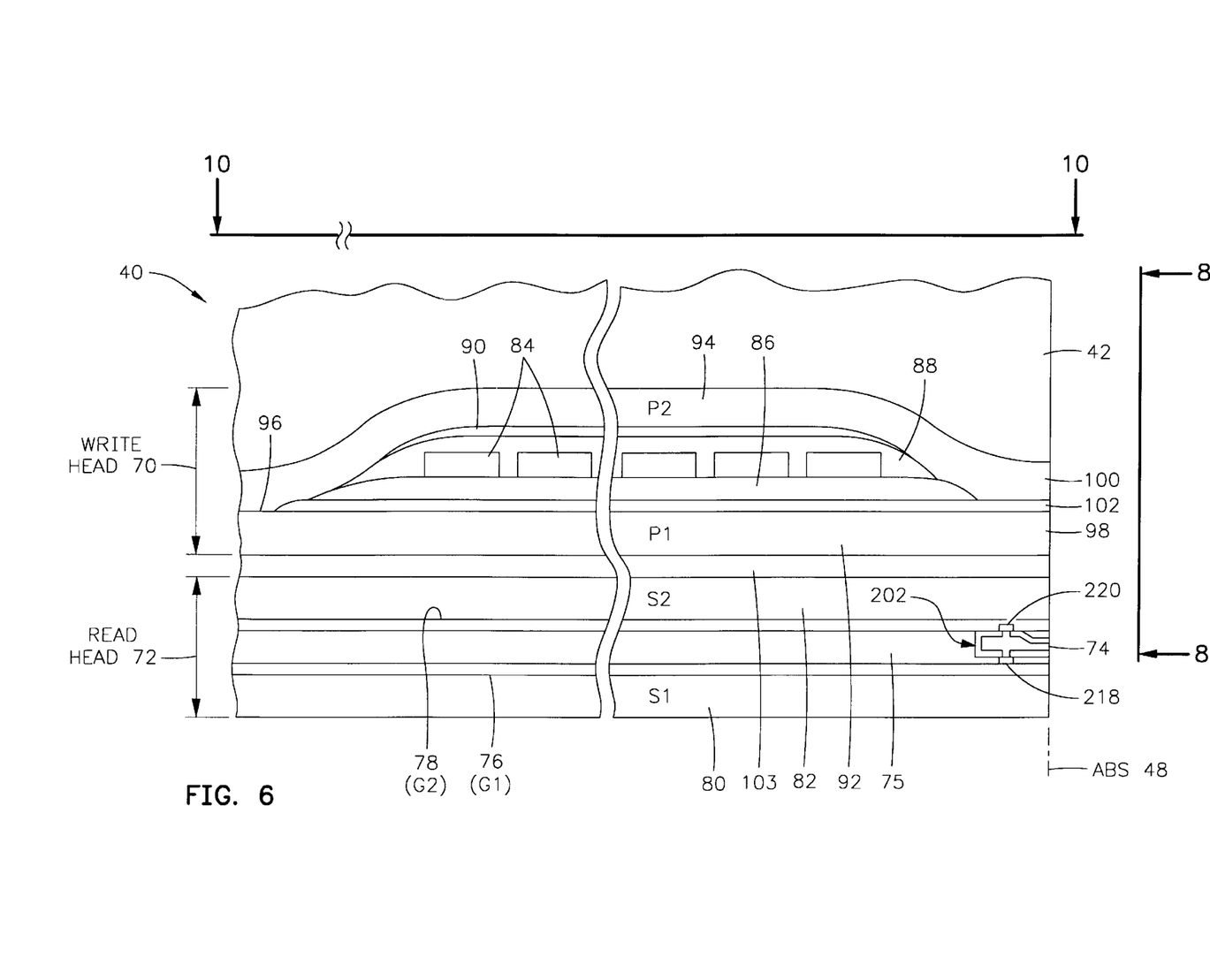
FIG. 6 is a partial view of the slider and a piggyback magnetic head as seen in plane 6—6 of FIG. 2.
Figure 8:
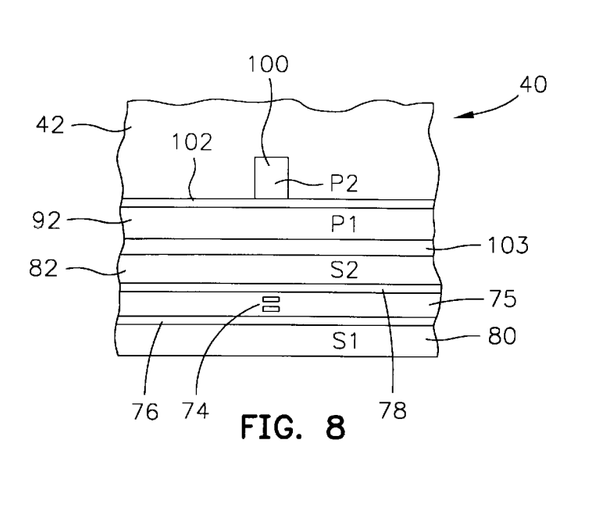
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing tunnel junction sensors 74 of the present invention. FIG. 8 is an ABS view of FIG. 6. A nonmagnetic electrically insulative layer 75 is employed for separating the sensor and the insulation layer 75 as well as the sensors located between nonmagnetic electrically insulative first and second read gap layers (G1) and (G2) 76 and 78. The insulation layers 75, 76 and 78 may be aluminum oxide ($Al_2O_3$). The first and second read gap layers 76 and 78 are sandwiched between ferromagnetic first and second shield layers 80 and 82. In response to external magnetic fields, the resistance of the tunnel junction sensor 74 changes. A sense current ($I_S$) conducted through the sensor causes these resistance changes to be manifested as potential changes. These potential changes are then processed as readback signals by the processing circuitry 50 shown in FIG. 3. The sense current ($I_S$) is conducted through the tunnel junction sensor 74 perpendicular to the planes of its major thin film surfaces by first and second leads, which will be discussed in more detail hereinafter. Optionally the sensor may be a spin valve sensor, which will be discussed in more detail hereinafter.

Figure 10:
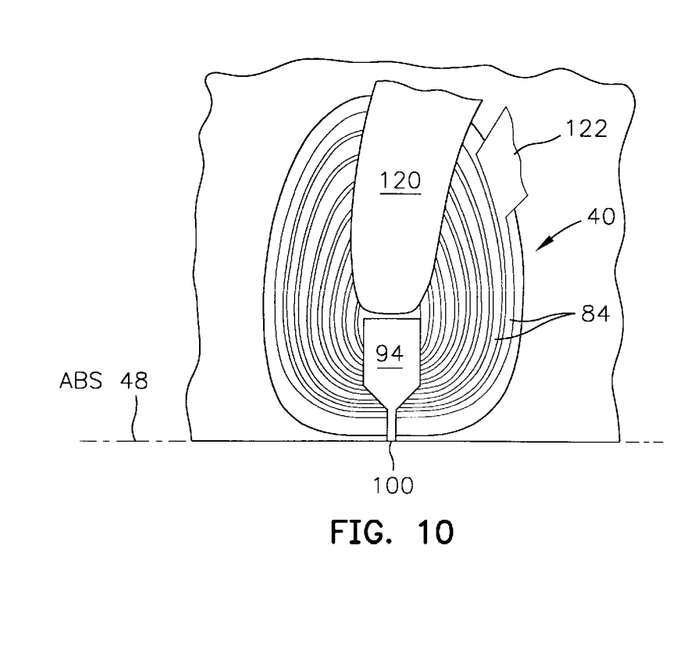
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
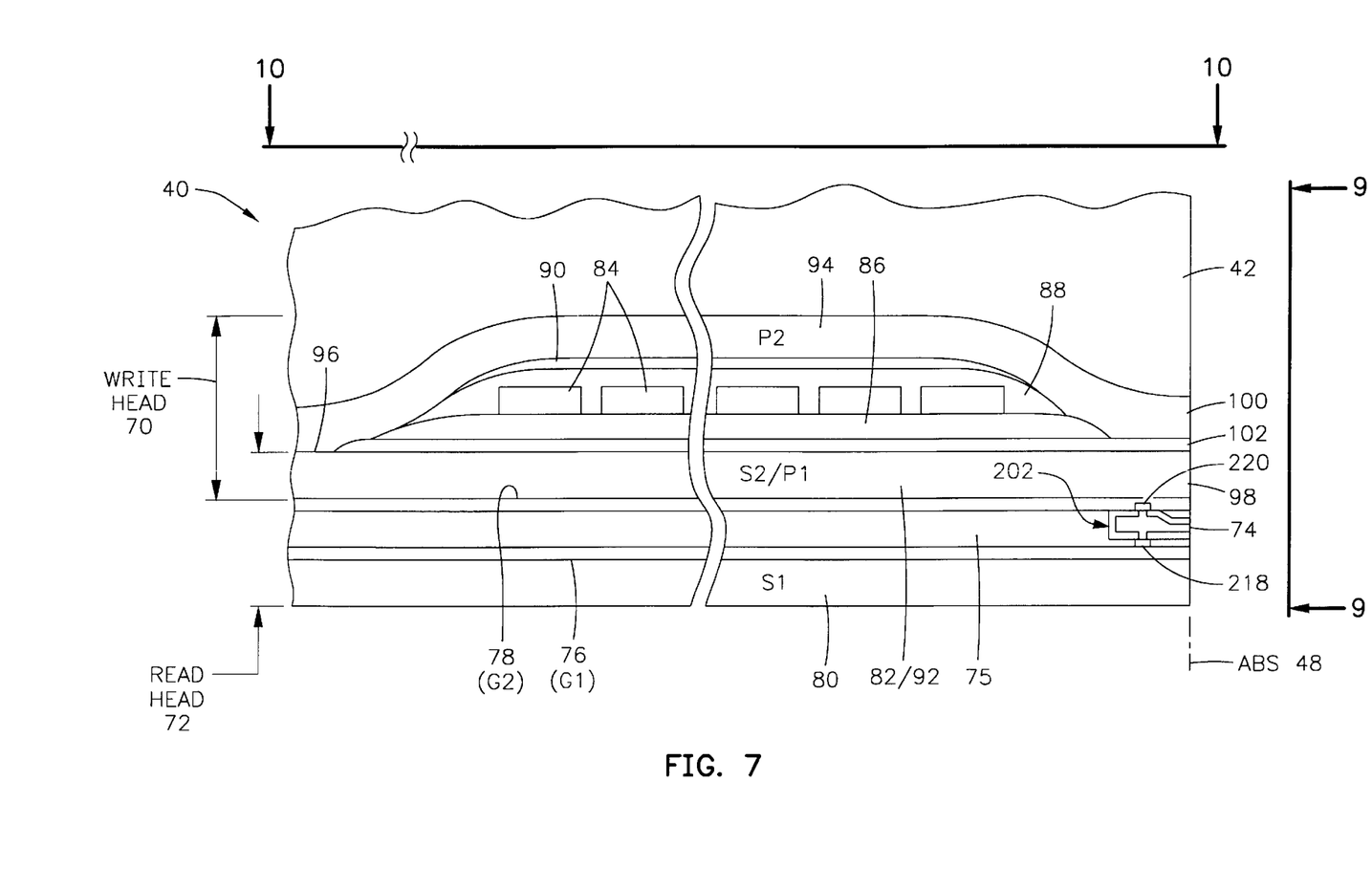
FIG. 7 is a partial view of the slider and a merged magnetic head as seen in plane 7—7 of FIG. 2.
Figure 9:
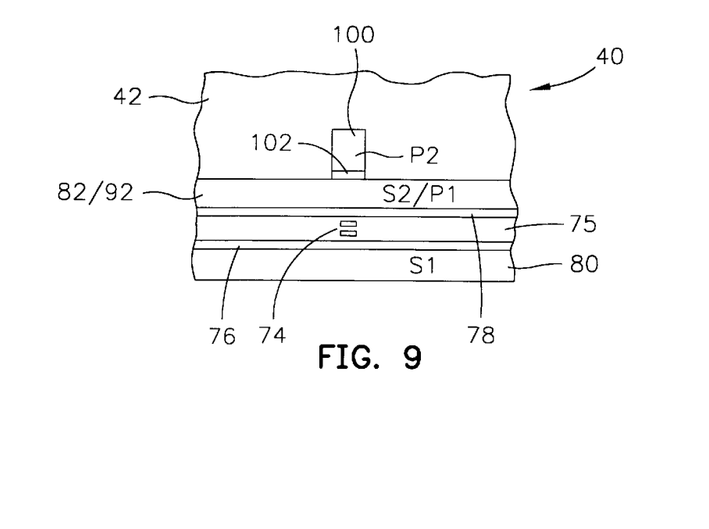
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

The Invention

Figure 11:
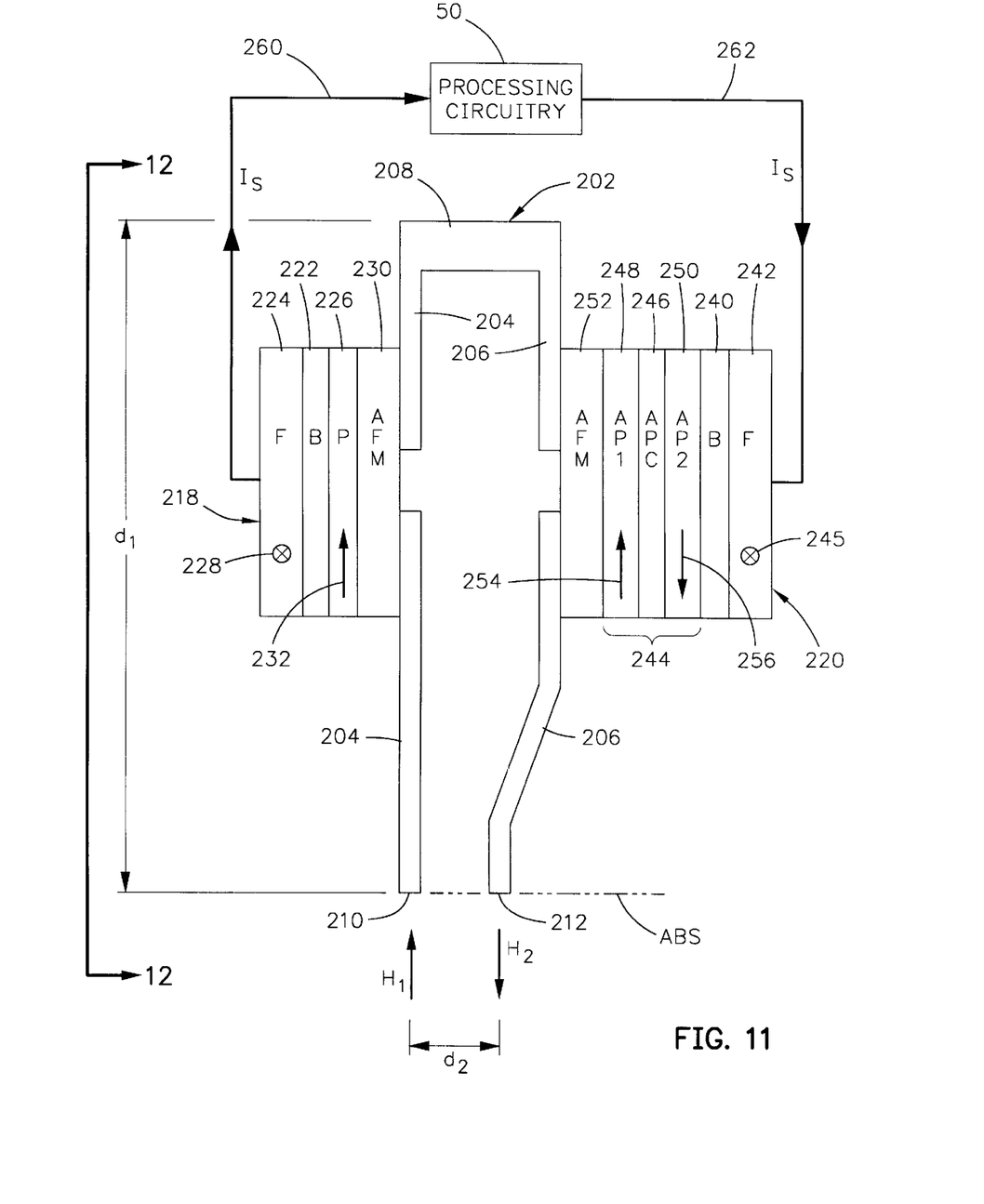
FIG. 11 is a side illustration of the present invention wherein a pair of tunnel junctions sensors are employed.

FIG. 11 is a schematic side illustration of one embodiment 200 of the present invention which employs a pair of tunnel junction type of sensors. The embodiment 200 has a yoke 202 which has first and second legs 204 and 206 which are interconnected within the head at a distance $d_1$ from the ABS by any suitable means such as a cross-piece 208. The first and second legs 204 and 206 have first and second end edges 210 and 212 respectively which are located at the ABS and are spaced apart by a distance $d_2$ which will be discussed in more detail hereinafter.

Figures 12, 14:
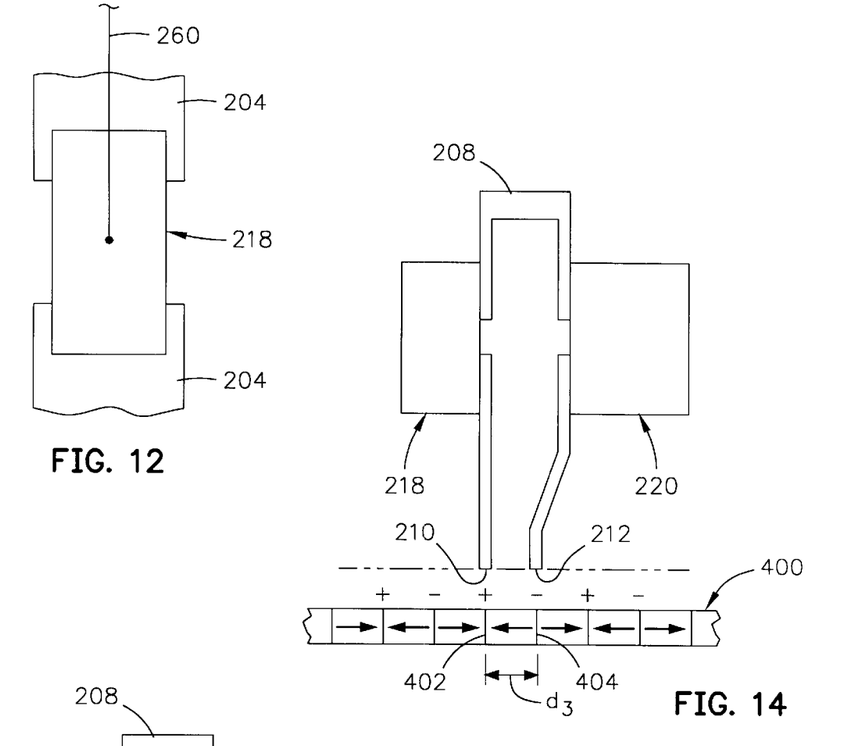
FIG. 12 is a view taken along plane 12—12 of FIG. 11.
FIG. 14 is a schematic illustration of the present invention in combination with a horizontally recorded track on a magnetic disk.

The first and second legs 204 and 206 have first and second separations 214 and 216 which are located between the ABS and the distance $d_1$ which electrically and magnetically disconnect leg portions of each leg. A first tunnel junction sensor 218 is magnetically connected to the first leg across the first separation 214 and a second tunnel junction sensor 220 is connected to the second leg across the second separation 216. FIG. 12 is a view taken along plane 12—12 of FIG. 11 showing the first tunnel junction sensor 218 bridging across the leg portions of the first leg 204. A similar view taken of the tunnel junction 220 and the leg 206 would be similar to FIG. 12.

The first tunnel junction sensor 218 includes a nonmagnetic electrically insulative barrier layer (B) 222 which is located between a ferromagnetic free layer (F) 224 and a ferromagnetic pinned layer (P) 226. The free layer 224 has a magnetic moment 228 which is parallel to the ABS and to the major thin film surfaces of the layers of the sensor 218 in a direction out of the paper or into the paper, as shown in FIG. 11. The pinned layer 226 interfaces and is exchange coupled to an anti-ferromagnetic (AFM) pinning layer 230 which pins a magnetic moment 232 of the pinned layer perpendicular to the ABS in a direction out of the head or into the head, as shown in FIG. 11. The second tunnel junction sensor 220 includes a nonmagnetic electrically insulative barrier layer (B) 240 which is located between a free layer 242 and an antiparallel (AP) pinned layer structure 244. The free layer 242 has a magnetic moment 245 which is parallel to the ABS and the major thin film surfaces of the sensor in a direction either out of the sensor or into the sensor, as shown in FIG. 11. The AP pinned layer structure 244 includes an antiparallel coupling layer (APC) 246 which is located between ferromagnetic first and second AP pinned layers (AP) and (AP2) 248 and 250. The first AP pinned layer 248 interfaces and is exchange coupled to an antiferromagnetic (AFM) pinning layer 252 which pins a magnetic moment 254 of the first AP pinned layer perpendicular to the ABS in a direction either out of the read head or into the read head, as shown in FIG. 11. By a strong antiparallel coupling between the first and second AP pinned layers 248 and 250 the second AP pinned layer 250 has a magnetic moment 256 which is antiparallel to the magnetic moment 254. This arrangement causes the magnetic moments 256 and 232 to be antiparallel or out-of-phase with respect to each other which will cause resistances of the first and second tunnel junction sensors 218 and 220 to be combined to increase the signal of the read head.

All of the layers of the tunnel junction sensors 218 and 220 are electrically conductive except for the barrier layers 222 and 240. Exemplary materials are nickel iron (NiFe) for the free layers 224 and 242, aluminum oxide ($Al_2O_3$) for the barrier layers 222 and 240, cobalt (Co) or cobalt iron (CoFe) for the pinned layers 226, 248 and 250, ruthenium (Ru) for the antiparallel coupling layer 246 and platinum manganese (PtMn) for the antiferromagnetic layers 230 and 252.

As shown in FIG. 11, a first lead 260 connects the first tunnel junction sensor 218 to processing circuitry 50 and a second lead 262 connects the second tunnel junction sensor 220 to the processing circuitry 50. The first lead 260 may be connected to a central portion of the thin film surface of the free layer 224 and the second lead 262 may be connected to a central portion of the thin film surface of the free layer 242. As shown in FIG. 11, each of the sensors 218 and 220 is electrically connected to a top portion of the yoke 202. The yoke is preferably nickel iron (NiFe) so that it is magnetically and electrically conductive. Accordingly, the first and second tunnel junctions 218 and 220 and the processing circuitry 50 are in series with respect to one another so that a sense current $I_S$, generated by the processing circuitry 50, is conducted through the first tunnel junction sensor 218 perpendicular to the thin film surfaces of the sensor, thence through the top portion of the yoke 202, thence perpendicular to the thin film surfaces of the second tunnel junction sensor 220 and thence to the processing circuitry 50 to complete the series circuit.

The distance $d_2$ between the end edges 210 and 212 is sized to be equal to the distance between magnetic impressions on a track of a rotating disk, which will be discussed in more detail hereinafter. Assuming for now that a signal field $H_1$ is directed upwardly at the end edge 210, this will cause the magnetic moment 228 to be rotated upwardly into the head. This causes the magnetic moments 228 and 232 to become more parallel with respect to each other which will reduce the resistance of the tunnel junction sensor 218. Assuming a signal field $H_2$ is directed downwardly away from the head adjacent the end edge 212, this will cause the magnetic moment 245 of the free layer to be rotated downwardly out of the head. This will cause the magnetic moments 245 and 256 to become more parallel which will reduce the resistance of the second tunnel junction sensor 220. The resistances of the tunnel junction sensors 218 and 220 are both lowered and combined to provide a lower resistance to the sense current $I_S$. If the directions of the signal fields $H_1$ and $H_2$ are reversed the resistances of the first and second tunnel junction sensors 218 and 220 would both increase to combine to increase the resistance of the sensors to the sense current $I_S$. Accordingly, the signals are significantly increased and noise in the circuit is reduced by common mode rejection. The changes in the resistance of the tunnel junction sensors 218 and 220 are processed as playback signals by the processing circuitry 50.

Figure 13:
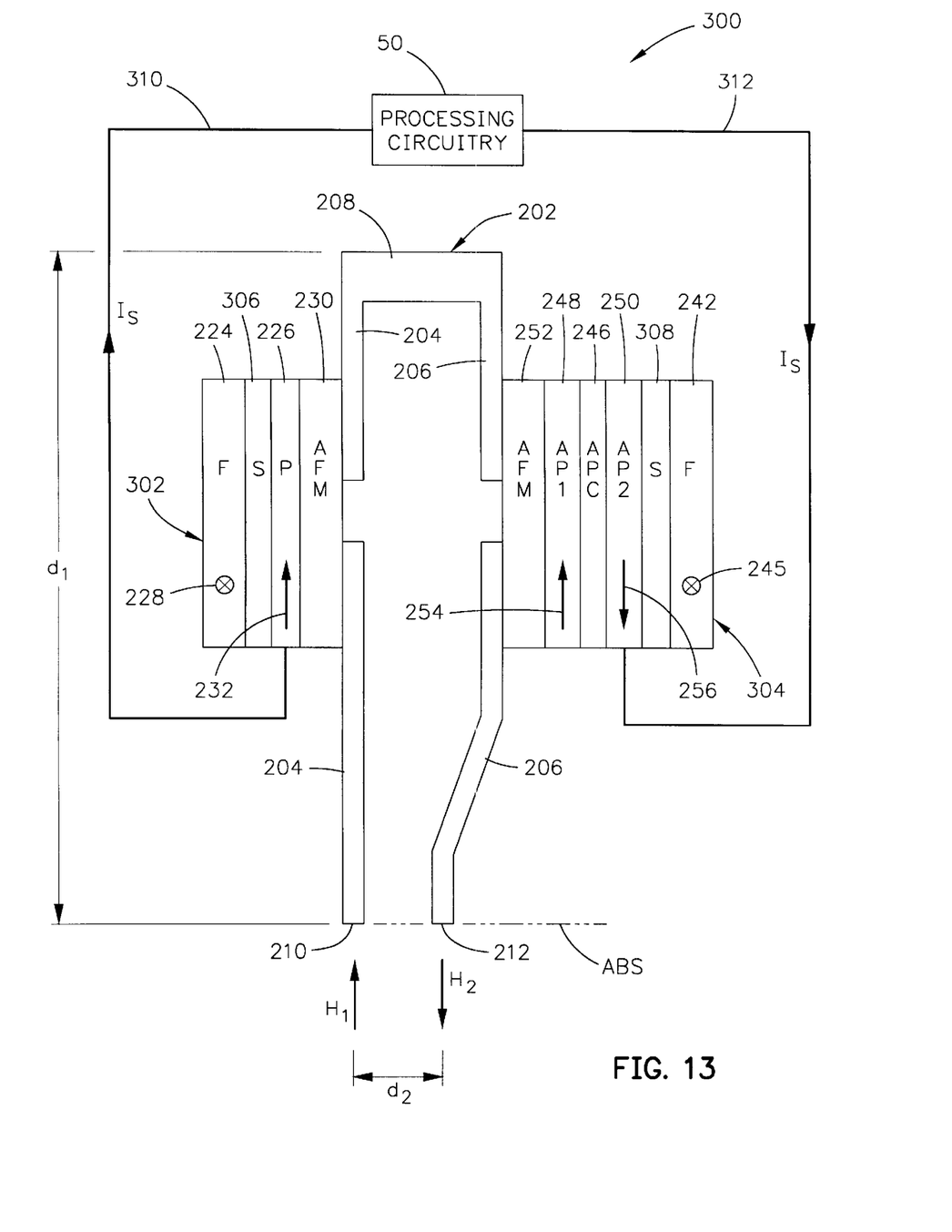
FIG. 13 is a side illustration of the present invention wherein a pair of spin valve sensors is employed.

FIG. 13 is an illustration of another embodiment 300 of the present invention which is the same as the embodiment 200 in FIG. 11 except first and second spin valve sensors 302 and 304 are employed in place of the tunnel junction sensors 218 and 220 and the connection to the processing circuitry 50 is different, which will be explained in more detail hereinbelow. The spin valve sensors 302 and 304 are the same as the tunnel junction sensors 218 and 220 except the spin valve sensor 302 employs a nonmagnetic electrically conductive spacer layer (S) 306 instead of the barrier layer 222 and the spin valve sensor 304 employs a nonmagnetic electrically conductive spacer layer (S) 308 instead of the barrier layer 240. As shown in FIG. 13, a lead 310 connects the first spin valve sensor 302 to the processing circuitry 50 and a second lead 312 connects the second spin valve sensor 304 to the processing circuitry 50. The first and second leads 310 and 312 are preferably connected to end edges of the spin valve sensors 302 and 304 by a contiguous junction which is further described in U.S. Pat. No. 5,018,037. Accordingly, the sense current $I_S$ enters the first spin valve sensor 302 at one edge, thence exits the first spin valve sensor at an opposite edge, thence is conducted through the top portion of the yoke 202, thence enters the second spin valve sensor 304 at one end edge, thence exits the second spin valve sensor at an opposite end edge and thence is conducted back to the processing circuitry 50 by the lead 312. Accordingly, the first and second spin valve sensors 302 and 304 and the processing circuitry 50 are in-series with respect to one another, the same as the embodiment 200 in FIG. 11. The operation of the embodiment 300 in FIG. 13 is essentially the same as the operation of the embodiment in FIG. 11 upon receiving the field signals $H_1$ and $H_2$.

FIG. 14 is a schematic illustration of either read head 200/300 in combination with a portion of a track 400 from a rotating magnetic disk, such as disk 34 in FIG. 1. The track 400 has been horizontally recorded with magnetic impressions which are directed from either left to right or right to left parallel to the surface of the disk. The location where the magnetic impressions meet is known as a transition, such as transitions 402 and 404. The distance between these transitions is $d_3$ which is equal to $d_2$ between the end edges of the read head at the ABS. With the arrangement shown in FIG. 14, the end edge 210 receives a positive-going field signal and the end edge 212 receives a negative-going field signal which corresponds to that shown in FIGS. 11 and 13 and results lower resistances in the sensors, as discussed hereinabove. When the end edges 210 and 212 receive the next field signals in the next transitions as the track 400 moves from right to left the resistances of the sensors will be increased, as discussed hereinabove.

Figure 15:
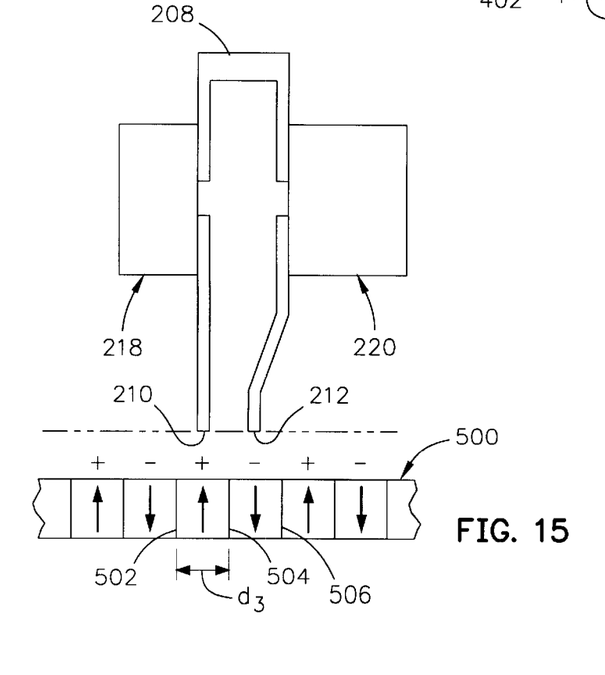
FIG. 15 is a schematic illustration of the present invention in combination with a perpendicularly recorded track on a magnetic disk.

FIG. 15 is a schematic illustration of either of the read head 200/300 in combination with a track 500 of the disk which is perpendicularly recorded with magnetic impressions oriented either upwardly or downwardly perpendicular to a surface of the disk. Exemplary transitions between the magnetic impressions are shown at 502, 504 and 506. In this embodiment the end edges 210 and 212 are centered between the transitions, such as edge 210 is centered between the transitions 502 and 504 and the end edge 212 is centered between the end edges 504 and 506 with the distance between the centers of the transitions being $d_3$ being equal to the distance $d_2$ between the end edges 210 and 212.

Discussion

It should be understood that pinned layer structures 226 and 244 may be made differently than that shown in FIGS. 11 and 13, provided that these pinned layer structures are out-of-phase with respect to one another. For instance, each of the pinned layer structures may be a single pinned layer with their magnetic moments antiparallel with respect to one another. In this instance the pinning layers 230 and 252 will have to have different blocking temperatures so that the magnetic moments can be set separately without interfering with the setting of the first pinning layer. The blocking temperature is the temperature at which the magnetic spins of the pinning layer are free to rotate in the presence of a magnetic field. For instance, the first pinning layer 230 may be iron manganese (FeMn) which has a blocking temperature of 160° C. and the second pinning layer 252 may be platinum manganese (PtMn) which has a blocking temperature of 350° C. Accordingly, the pinning layer 230 has a lower blocking temperature than the pinning layer 252 which means that the magnetic spins of the pinning layer 252 has to be set before the magnetic spins of the first pinning layer 230. As an example, the partially completed head is subjected to a temperature at or close to the blocking temperature of the first pinning layer 252 in the presence of a field which is oriented in the same direction as the magnetic moment 256. When this heat and magnetic field are terminated the magnetic spins of the pinning layer 252 are oriented parallel to the magnetic moment 256. When the partially completed head is then subjected to the lower temperature of 160° C. in the presence of a field which is oriented in the same direction as the magnetic moment 232, the magnetic spins of the pinning layer 230 will be oriented parallel to the magnetic moment 232. Since the magnetic moments of the first and second sensors are antiparallel they are out-of-phase with respect to one another and will function as described hereinabove. Another option would be that one of the sensors employ a triple AP pinned layer structure and the second sensor employ a double AP pinned layer structure. It should be noted that this last option will enable both sensors to have a very low demagnetizing field emanating from the pinned layer structures which will enable the magnetic moment of the free layers to be more properly biased parallel to the ABS. Again, the magnetic moments adjacent the separation layer, whether it be a barrier layer or a spacer layer, are antiparallel, as described hereinabove.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A read head, which has an air bearing surface (ABS), comprising:

a yoke having first and second legs which are interconnected at a location within the head at a distance $d_1$, from the ABS wherein the first and second legs have first and second end edges respectively which are located at the ABS and spaced apart by a distance $d_2$;

the first and second legs having first and second separations respectively located between the ABS and the distance $d_1$ which magnetically and electrically disconnect leg portions of each leg;

a first sensor magnetically and electrically connected to the first leg across said first separation and a second sensor magnetically and electrically connected to the second leg across said second separation;

a the first sensor having a first pinned layer structure and the second sensor having a second pinned layer structure; and the first and second pinned layer structures having first and second magnetic moments respectively that are antiparallel with respect to each other.

2. A read head as claimed in claim 1 wherein the first pinned layer structure is an antiparallel (AP) pinned layer structure and the second pinned layer structure is a single layer pinned layer structure.

3. A read head as claimed in claim 2 wherein the distance $d_2$ equals a distance between magnetic impressions along a track of a magnetic disk.

4. A read head as claimed in claim 3 including:

first and second leads for interconnecting the first and second sensors respectively to a processing circuit for conducting a sense current through the sensors.

5. A read head as claimed in claim 4 wherein each sensor is a tunnel junction sensor.

6. A read head as claimed in claim 4 wherein each sensor is a spin valve sensor.

7. A magnetic read head, which has an air bearing surface (ABS), comprising:

a first sensor including:
   a ferromagnetic pinned layer structure that has a magnetic moment;
   a pinning layer exchange coupled to the pinned layer structure for pinning the magnetic moment of the pinned layer structure;
   a free layer; and
   a separation layer located between the free layer and the pinned layer structure;

a second sensor including:
   a ferromagnetic pinned layer structure that has a magnetic moment;
   a pinning layer exchange coupled to the pinned layer structure for pinning the magnetic moment of the pinned layer structure;
   a free layer; and
   a separation layer located between the free layer and the pinned layer structure;

a yoke having first and second legs which are interconnected at a location within the head at a distance $d_1$ from the ABS wherein the first and second legs have first and second end edges respectively which are located at the ABS and which are spaced apart by a distance $d_2$;

the first and second legs having first and second separations respectively located between the ABS and the distance $d_1$ which magnetically and electrically disconnect leg portions of the first and second legs respectively;

the first sensor being magnetically and electrically connected to the first leg across said first separation and the second sensor being magnetically and electrically connected to the second leg across the second separation;

the pinned layer structure of the first sensor having a magnetic moment and the pinned layer structure of the second sensor having a magnetic moment; and the magnetic moments of the pinned layer structures of the first and second sensors being antiparallel with respect to each other.

8. A magnetic read head as claimed in claim 7 including:

nonmagnetic nonconductive first and second read gap layers;

the yoke and the sensors being located between the first and second read gap layers;

ferromagnetic first and second shield layers; and the first and second read gap layers being located between the first and second shield layers.

9. A magnetic read head as claimed in claim 8 wherein the pinned layer structure of the second sensor is an antiparallel (AP) pinned layer structure which includes:

ferromagnetic first and second antiparallel (AP) pinned layers with the first AP pinned layer interfacing the pinning layer of the second sensor and the second AP pinned layer interfacing the separation layer of the second sensor; and an antiparallel (AP) coupling layer located between and interfacing the first and second AP pinned layers.

10. A magnetic read head as claimed in claim 9 wherein the distance $d_2$ equals a distance between magnetic impressions along a track of a magnetic disk.

11. A magnetic read head as claimed in claim 10 including:

each of the separation layers of the first and second sensors being a nonmagnetic electrically insulative barrier layer; and the first and second leads being connected to the sensors for conducting the sense current through the sensors perpendicular to major thin film plane surfaces of the layers of the sensor.

12. A magnetic read head as claimed in claim 10 including:

each of the separation layers of the first and second sensors being a nonmagnetic electrically conductive spacer layer; and first and second leads connected to the sensors for conducting a sense current through the sensors parallel to major thin film plane surfaces of the layers of the sensor.

13. A magnetic head assembly having an air bearing surface (ABS), comprising:

a write head including:
   ferromagnetic first and second pole piece layers that have a yoke portion located between a pole tip portion and a back gap portion;
   a nonmagnetic write gap layer located between the pole tip portions of the first and second pole piece layers;
   an insulation stack with at least one coil layer embedded therein located between the yoke portions of the first and second pole piece layers; and
   the first and second pole piece layers being connected at their back gap portions;

a read head including:
   a first sensor including:
      a ferromagnetic pinned layer structure that has a magnetic moment;
      a pinning layer exchange coupled to the pinned layer structure for pinning the magnetic moment of the pinned layer structure;
      a free layer;
      a separation layer located between the free layer and the pinned layer structure;

a second sensor including:
   a ferromagnetic pinned layer structure that has a magnetic moment;
   a pinning layer exchange coupled to the pinned layer structure for pinning the magnetic moment of the pinned layer structure;
   a free layer; and
   a separation layer located between the free layer and the pinned layer structure;
a yoke having first and second legs which are interconnected at a location within the head at a distance $d_1$ from the ABS wherein the first and second legs have first and second end edges respectively which are located at the ABS and which are spaced apart by a distance $d_2$;
the first and second legs having first and second separations respectively located between the ABS and the distance $d_1$ which magnetically and electrically disconnect leg portions of the first and second legs respectively;
the first sensor being magnetically and electrically connected to the first leg across said first separation and the second sensor being magnetically and electrically connected to the second leg across the second separation;
the pinned layer structure of the first sensor having a magnetic moment and the pinned layer structure of the second sensor having a magnetic moment;
the magnetic moments of the pinned layer structures of the first and second sensors being antiparallel with respect to each other;
nonmagnetic nonconductive first and second read gap layers;
the yoke and the sensors being located between the first and second read gap layers;
a ferromagnetic first shield layer; and
the first and second gap layers being located between the first shield layer and the first pole piece layer.

14. A magnetic head assembly as claimed in claim 13 including:
   a ferromagnetic second shield layer;
   a nonmagnetic isolation layer located between the second shield layer and the first pole piece layer.

15. A magnetic head assembly as claimed in claim 13 wherein the pinned layer structure of the second sensor is an antiparallel (AP) pinned layer structure which includes:
   ferromagnetic first and second antiparallel (AP) pinned layers with the first AP pinned layer interfacing the pinning layer of the second sensor and the second AP pinned layer interfacing the separation layer of the second sensor; and
   an antiparallel (AP) coupling layer located between and interfacing the first and second AP pinned layers.

16. A magnetic head assembly as claimed in claim 15 wherein the distance $d_2$ equals a distance between magnetic impressions along a track of a magnetic disk.

17. A magnetic head assembly as claimed in claim 16 including:
   each of the separation layers of the first and second sensors being a nonmagnetic electrically insulative barrier layer; and
   the first and second leads being connected to the sensors for conducting the sense current through the sensors perpendicular to major thin film plane surfaces of the layers of the sensor.

18. A magnetic head assembly as claimed in claim 16 including:
   each of the separation layers of the first and second sensors being a nonmagnetic electrically conductive spacer layer; and
   first and second leads connected to the sensors for conducting a sense current through the sensors parallel to major thin film plane surfaces of the layers of the sensor.

19. A magnetic disk drive including at least one magnetic head assembly that has an air bearing surface (ABS) and that includes a write head and a read head, comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   a read head including:
      a first sensor including:
         a ferromagnetic pinned layer structure that has a magnetic moment;
         a pinning layer exchange coupled to the pinned layer structure for pinning the magnetic moment of the pinned layer structure;
         a free layer;
         a separation layer located between the free layer and the pinned layer structure;
      a second sensor including:
         a ferromagnetic pinned layer structure that has a magnetic moment;
         a pinning layer exchange coupled to the pinned layer structure for pinning the magnetic moment of the pinned layer structure;
         a free layer; and
         a separation layer located between the free layer and the pinned layer structure;
      a yoke having first and second legs which are interconnected at a location within the head at a distance $d_1$ from the ABS wherein the first and second legs have first and second end edges respectively which are located at the ABS and which are spaced apart by a distance $d_2$;
      the first and second legs having first and second separations respectively located between the ABS and the distance $d_1$ which magnetically and electrically disconnect leg portions of the first and second legs respectively;
      the first sensor being magnetically and electrically connected to the first leg across said first separation and the second sensor being magnetically and electrically connected to the second leg across the second separation;
      the pinned layer structure of the first sensor having a magnetic moment and the pinned layer structure of the second sensor having a magnetic moment;
      the magnetic moments of the pinned layer structures of the first and second sensors being antiparallel with respect to each other;
      nonmagnetic nonconductive first and second read gap layers;

the yoke and the sensors being located between the first and second read gap layers;

a ferromagnetic first shield layer; and the first and second gap layers being located between the first shield layer and the first pole piece layer;

a housing;

a magnetic disk rotatably supported in the housing and having a series of magnetic impressions along a plurality of tracks with a distance $d_3$ between the impressions which is equal to said distance $d_2$;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head to multiple positions with respect to said magnetic disk; and a processor connected to the magnetic head, to the spindle motor and to the actuator for exchanging signals with the magnetic head, for controlling movement of the magnetic disk and for controlling the position of the magnetic head.

20. A magnetic disk drive as claimed in claim 19 including:

a ferromagnetic second shield layer;

a nonmagnetic isolation layer located between the second shield layer and the first pole piece layer.

21. A magnetic disk drive as claimed in claim 19 wherein the pinned layer structure of the second sensor is an antiparallel (AP) pinned layer structure which includes:

ferromagnetic first and second antiparallel (AP) pinned layers with the first AP pinned layer interfacing the pinning layer of the second sensor and the second AP pinned layer interfacing the separation layer of the second sensor; and an antiparallel (AP) coupling layer located between and interfacing the first and second AP pinned layers.

22. A magnetic disk drive as claimed in claim 21 including:

each of the separation layers of the first and second sensors being formed as a nonmagnetic electrically insulative barrier layer; and connecting the first and second leads to the sensors so that the sense current is conducted through the sensors perpendicular to major thin film surface planes of the layers of the sensor.

23. A magnetic disk drive as claimed in claim 21 including:

each of the separation layers of the first and second sensors being formed as a nonmagnetic electrically conductive spacer layer; and connecting first and second leads to the sensors so that a sense current is conducted through the sensors parallel to major thin film surface planes of the layers of the sensor.

24. A method of making a read head, which has an air bearing (ABS) surface, comprising the steps of:

forming a yoke having first and second legs which are interconnected at a location within the head at a distance $d_1$ from the ABS wherein the first and second legs have first and second end edges respectively which are located at the ABS and which are spaced apart by a distance $d_2$;

forming the first and second legs with first and second separations respectively between the ABS and the distance $d_1$ which magnetically and electrically disconnect leg portions of each leg;

magnetically and electrically connecting a first sensor to the first leg across said first separation and magnetically and electrically connecting a second sensor to the second leg across said second separation;

forming the first sensor with a first pinned layer structure and forming the second sensor with a second pinned layer structure wherein the first and second pinned layer structures have first and second magnetic moments respectively that are antiparallel with respect to each other.

25. A method of making a read head as claimed in claim 24 wherein the first pinned layer structure is formed as an antiparallel (AP) pinned layer structure and the second pinned layer structure is formed as a single layer pinned layer structure.

26. A method of making a read head as claimed in claim 25 wherein the distance $d_2$ is formed to equal a distance between magnetic impressions along a track of a magnetic disk.

27. A method of making a read head as claimed in claim 26 including:

connecting first and second leads to the first and second sensors respectively for conducting a sense current through the sensors.

28. A method of making a read head as claimed in claim 27 wherein each sensor is formed as a tunnel junction sensor.

29. A method of making a read head as claimed in claim 27 wherein each sensor is formed as a spin valve sensor.

30. A method of making a magnetic read head which has an air bearing surface (ABS), comprising the steps of:

making a first sensor including the steps of:

forming a ferromagnetic pinned layer structure that has a magnetic moment;

forming a pinning layer exchange coupled to the pinned layer structure for pinning the magnetic moment of the pinned layer structure;

forming a free layer; and forming a separation layer between the free layer and the pinned layer structure;

making a second sensor including including the steps of:

forming a ferromagnetic pinned layer structure that has a magnetic moment;

forming a pinning layer exchange coupled to the pinned layer structure for pinning the magnetic moment of the pinned layer structure;

forming a free layer; and forming a separation layer between the free layer and the pinned layer structure;

forming a yoke having first and second legs which are interconnected at a location within the head at a distance $d_1$ from the ABS wherein the first and second legs have first and second end edges respectively which are located at the ABS and which are spaced apart by a distance $d_2$;

forming the first and second legs with first and second separations respectively between the ABS and the distance $d_1$ which magnetically and electrically disconnect leg portions of the first and second legs respectively;

magnetically and electrically connecting the first sensor to the first leg across said first separation and magnetically and electrically connecting the second sensor to the second leg across the second separation; and forming the pinned layer structure of the first sensor with a magnetic moment and forming the pinned layer structure of the second sensor with a magnetic moment wherein the magnetic moments of the pinned layer structures of the first and second sensors are antiparallel with respect to each other.

31. A method of making a magnetic read head as claimed in claim 30 including:

forming nonmagnetic nonconductive first and second read gap layers;

forming the yoke and the sensor between the first and second read gap layers;

forming ferromagnetic first and second shield layers; and forming the first and second read gap layers between the first and second shield layers.

32. A method of making a magnetic read head as claimed in claim 31 wherein the pinned layer structure of the second sensor is made by the steps of:

forming ferromagnetic first and second antiparallel (AP) pinned layers with the first AP pinned layer interfacing the pinning layer of the second sensor and the second AP pinned layer interfacing the separation layer of the second sensor; and forming an antiparallel (AP) coupling layer between and interfacing the first and second AP pinned layers.

33. A method of making a magnetic read head as claimed in claim 32 wherein the distance $d_2$ is formed to equal a distance between magnetic impressions along a track of a magnetic disk.

34. A method of making a magnetic read head as claimed in claim 33 including:

each of the separation layers of the first and second sensors being formed as a nonmagnetic electrically insulative barrier layer; and connecting the first and second leads to the sensors so that the sense current is conducted through the sensors perpendicular to major thin film surface planes of the layers of the sensor.

35. A method of making a magnetic read head as claimed in claim 33 including:

each of the separation layers of the first and second sensors being formed as a nonmagnetic electrically conductive spacer layer; and connecting first and second leads to the sensors so that a sense current is conducted through the sensors parallel to major thin film surface planes of the layers of the sensor.

36. A method of making magnetic head assembly that has an air bearing surface (ABS), comprising the steps of:

making a write head including the steps of:

forming ferromagnetic first and second pole piece layers in pole tip, yoke and back gap regions wherein the yoke region is located between the pole tip and back gap regions;

forming a nonmagnetic nonconductive write gap layer between the first and second pole piece layers in the pole tip region;

forming an insulation stack with at least one coil layer embedded therein between the first and second pole piece layers in the yoke region; and connecting the first and pole piece layers at said back gap region; and making a read head including the steps of:

making a first sensor including the steps of:

forming a ferromagnetic pinned layer structure that has a magnetic moment;

forming a pinning layer exchange coupled to the pinned layer structure for pinning the magnetic moment of the pinned layer structure;

forming a free layer; and forming a separation layer between the free layer and the pinned layer structure;

making a second sensor including including the steps of:

forming a ferromagnetic pinned layer structure that has a magnetic moment;

forming a pinning layer exchange coupled to the pinned layer structure for pinning the magnetic moment of the pinned layer structure;

forming a free layer; and forming a separation layer between the free layer and the pinned layer structure;

forming a yoke having first and second legs which are interconnected at a location within the head at a distance $d_1$ from the ABS wherein the first and second legs have first and second end edges respectively which are located at the ABS and which are spaced apart by a distance $d_2$;

forming the first and second legs with first and second separations respectively between the ABS and the distance $d_1$ which magnetically and electrically disconnect leg portions of the first and second legs respectively;

magnetically and electrically connecting the first sensor being to the first leg across said first separation and magnetically and electrically connecting the second sensor to the second leg across the second separation; and forming the pinned layer structure of the first sensor with a magnetic moment and forming the pinned layer structure of the second sensor with a magnetic moment wherein the magnetic moments of the pinned layer structures of the pinned layer structures of the first and second sensors are antiparallel with respect to each other.

37. A method of making a magnetic head assembly as claimed in claim 36 including:

forming a ferromagnetic second shield layer; and forming a nonmagnetic isolation layer between the second shield layer and the first pole piece layer.

38. A method of making a magnetic head assembly as claimed in claim 36 wherein the pinned layer structure of the second sensor is made by the steps of:

forming ferromagnetic first and second antiparallel (AP) pinned layers with the first AP pinned layer interfacing the pinning layer of the second sensor and the second AP pinned layer interfacing the separation layer of the second sensor; and forming an antiparallel (AP) coupling layer between and interfacing the first and second AP pinned layers.

39. A method of making a magnetic head assembly as claimed in claim 38 wherein the distance $d_2$ is formed to equal a distance between magnetic impressions along a track of a magnetic disk.

40. A method of making a magnetic head assembly as claimed in claim 39 including:

each of the separation layers of the first and second sensors being formed as a nonmagnetic electrically insulative barrier layer; and connecting the first and second leads to the sensors so that the sense current is conducted through the sensors perpendicular to major thin film surface planes of the layers of the sensor.

41. A method of making a magnetic head assembly as claimed in claim 39 including:

each of the separation layers of the first and second sensors being formed as a nonmagnetic electrically conductive spacer layer; and connecting first and second leads to the sensors so that a sense current is conducted through the sensors parallel to major thin film surface planes of the layers of the sensor.

* * * * *